(12) United States Patent
Michaelis et al.

(10) Patent No.: US 7,366,948 B2
(45) Date of Patent: Apr. 29, 2008

(54) SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR

(75) Inventors: Scott L. Michaelis, Plano, TX (US); William B. McHardy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 564 days.

(21) Appl. No.: 10/972,796

(22) Filed: Oct. 25, 2004

(65) Prior Publication Data

US 2006/0107106 A1    May 18, 2006

(51) Int. Cl.
*G06F 11/00* (2006.01)
(52) U.S. Cl. ..................................... 714/12
(58) Field of Classification Search ............ 714/11–13; 712/31
See application file for complete search history.

(56) References Cited

U.S. PATENT DOCUMENTS

| | | | |
|---|---|---|---|
| 5,226,152 A | 7/1993 | Klug et al. | |
| 5,249,188 A | 9/1993 | McDonald | |
| 5,751,932 A | 5/1998 | Horst et al. | |
| 5,758,058 A | 5/1998 | Milburn | |
| 5,764,660 A | 6/1998 | Mohat | |
| 5,915,082 A * | 6/1999 | Marshall et al. | 714/11 |
| 6,065,135 A * | 5/2000 | Marshall et al. | 714/11 |
| 6,148,348 A | 11/2000 | Garnett et al. | |
| 6,473,869 B2 | 10/2002 | Bissett et al. | |
| 6,560,682 B1 | 5/2003 | Miller et al. | |
| 6,604,177 B1 | 8/2003 | Kondo et al. | |
| 6,615,366 B1 | 9/2003 | Grochowski et al. | |
| 6,625,749 B1 * | 9/2003 | Quach | 714/10 |
| 6,675,324 B2 * | 1/2004 | Marisetty et al. | 714/30 |
| 6,687,851 B1 | 2/2004 | Somers et al. | |
| 6,754,787 B2 | 6/2004 | Miller et al. | |
| 7,003,691 B2 * | 2/2006 | Safford et al. | 714/11 |
| 7,134,047 B2 * | 11/2006 | Quach | 714/11 |
| 7,155,721 B2 * | 12/2006 | Safford et al. | 718/104 |
| 7,237,144 B2 * | 6/2007 | Safford et al. | 714/11 |
| 2002/0144177 A1 | 10/2002 | Kondo et al. | |
| 2003/0051190 A1 * | 3/2003 | Marisetty et al. | 714/11 |
| 2003/0070050 A1 | 4/2003 | Miller et al. | |
| 2004/0006722 A1 * | 1/2004 | Safford | 714/11 |
| 2004/0019771 A1 * | 1/2004 | Quach | 712/229 |

(Continued)

OTHER PUBLICATIONS

Microsoft Computer Dictionary, 4th Ed. Microsoft Press, 1999, p. 313.*

(Continued)

*Primary Examiner*—Christopher McCarthy

(57) ABSTRACT

According to one embodiment, a method comprises assigning a first processor of a multi-processor system a role of spare processor for at least a second processor, and responsive to detecting loss of lockstep (LOL) for any of the at least a second processor, the first processor replaces the processor for which the LOL is detected. The method further comprises reestablishing lockstep for the processor for which the LOL is detected, and assigning the processor having its lockstep reestablished the role of spare processor for at least the first processor.

25 Claims, 3 Drawing Sheets

U.S. PATENT DOCUMENTS

| | | | |
|---|---|---|---|
| 2004/0078650 A1* | 4/2004 | Safford et al. | 714/11 |
| 2004/0078651 A1* | 4/2004 | Safford et al. | 714/11 |
| 2004/0153857 A1 | 8/2004 | Yamazaki et al. | |
| 2005/0172164 A1* | 8/2005 | Fox et al. | 714/13 |
| 2005/0240811 A1* | 10/2005 | Safford et al. | 714/11 |
| 2006/0085677 A1* | 4/2006 | Safford et al. | 714/11 |
| 2006/0248384 A1* | 11/2006 | Safford | 714/11 |

OTHER PUBLICATIONS

"System and Method for Using Information Relating to a Detected Loss of Lockstep for Determining a Responsive Action".

"System and Method for Establishing a Spare Processor for Recovering From Loss of Lockstep in a Boot Processor".

"System and Method for Configuring Lockstep Mode of a Processor Module".

"System and Method for Providing Firmware Recoverable Lockstep Protection".

"System and Method for Switching the Role of Boot Processor to a Spare Processor Responsive to Detection of Loss of Lockstep in a Boot Processor".

"System and Method for Reestablishing Lockstep for a Processor Module for Which Loss of Lockstep is Detected".

"System and Method for System Firmware Causing an Operating System to Idle a Processor".

"System and Method for Reintroducing a Processor Module to an Operating System After Lockstep Recovery".

* cited by examiner

SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR

CROSS-REFERENCE TO RELATED APPLICATIONS

The present application is related to the following concurrently filed and commonly assigned U.S. patent application Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR"; Ser. No. 10/973,004 titled "SYSTEM AND METHOD FOR CONFIGURING LOCKSTEP MODE OF A PROCESSOR MODULE"; Ser. No. 10/973,076 titled "SYSTEM AND METHOD FOR PROVIDING FIRMWARE RECOVERABLE LOCKSTEP PROTECTION"; Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR"; Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED"; Ser. No. 10/972,888 titled "SYSTEM AND METHOD FOR SYSTEM FIRMWARE CAUSING AN OPERATING SYSTEM TO IDLE A PROCESSOR"; Ser. No. 10/973,075 titled "SYSTEM AND METHOD FOR REINTRODUCING A PROCESSOR MODULE TO AN OPERATING SYSTEM AFTER LOCKSTEP RECOVERY"; and Ser. No. 10/972,835 titled "SYSTEM AND METHOD FOR USING INFORMATION RELATING TO A DETECTED LOSS OF LOCKSTEP FOR DETERMINING A RESPONSIVE ACTION", the disclosures of which are hereby incorporated herein by reference.

DESCRIPTION OF RELATED ART

Silent Data Corruption ("SDC") is a difficult problem in the computing industry. In general, SDC refers to data that is corrupt, but which the system does not detect as being corrupt. SDCs primarily occur due to one of two factors: a) a broken hardware unit or b) a "cosmic" event that causes values to change somewhere in the system. Broken hardware means unit in a processor is instructed to add 1+1 and it returns the incorrect answer 3 instead of the correct answer 2. An example of a cosmic event is when a charged particle (e.g., alpha particle or cosmic ray) strikes a region of a computing system and causes some bits to change value (e.g., from a 0 to a 1 or from a 1 to a 0).

Numerous techniques have been developed for detecting SDC to prevent the SDC from remaining "silent" or "undetected" within a system, as well as preventing such SDC from propagating through the system. Examples of these techniques include parity-based mechanisms and error correcting codes (ECCs) on buses and memory locations, as well as checksums and/or cyclic redundancy checks (CRC) over regions of memory. Parity-based mechanisms are often employed in processors, wherein a parity bit is associated with each block of data when it is stored. The parity bit is set to one or zero according to whether there is an odd or even number of ones in the data block. When the data block is read out of its storage location, the number of ones in the block is compared with the parity bit. A discrepancy between the values indicates that the data block has been corrupted. ECCs are parity-based mechanisms that track additional information for each data block. The additional information allows the corrupted bit(s) to be identified and corrected.

Parity/ECC mechanisms have been employed extensively for caches, memories, and similar data storage arrays. In the remaining circuitry on a processor, such as data paths, control logic, execution logic, and registers (the "execution core"), it is more difficult to apply parity/ECC mechanisms for SDC detection. Thus, there is typically some unprotected area on a processor in which data corruption may occur and the parity/ECC mechanisms do not prevent the corrupted data from actually making it out onto the system bus. One approach to SDC detection in an execution core (or other unprotected area of the processor chip) is to employ "lockstep processing." Generally, in lockstep processing two processors are paired together, and the two processors perform exactly the same operations and the results are compared (e.g., with an XOR gate). If there is ever a discrepancy between the results of the lockstep processors, an error is signaled. The odds of two processors experiencing the exact same error at the exact same moment (e.g., due to a cosmic event occurring in both processors at exactly the same time or due to a mechanical failure occurring in each processor at exactly the same time) is nearly zero.

A pair of lockstep processors may, from time to time, lose their lockstep. "Loss of lockstep" (or "LOL") is used broadly herein to refer to any error in the pair of lockstep processors. One example of LOL is detection of data corruption (e.g., data cache error) in one of the processors by a parity-based mechanism and/or ECC mechanism. Another example of LOL is detection of the output of the paired processors not matching, which is referred to herein as a "lockstep mismatch." It should be recognized that in some cases the data in the cache of a processor may become corrupt (e.g., due to a cosmic event), which once detected (e.g., by a parity-based mechanism or ECC mechanism of the processor) results in LOL. Of course, unless such corrupt data is acted upon by the processor, the output of that processor will not fail to match the output of its paired processor and thus a "lockstep mismatch" will not occur. For example, suppose that a value of "1" is stored to first location of cache in each of a pair of lockstep processors and a value of "1" is also stored to a second location of cache in each of the pair of lockstep processors. Further suppose that a cosmic event occurs for a first one of the processors, resulting in the first location of its cache being changed from "1" to "0", and thus corrupted. This data corruption in the first processor is a LOL for the pair. An error detection mechanism of this first processor may detect the data corruption, thus detecting the LOL. If the processors are instructed to act on the data of their first cache locations, then a lockstep mismatch will occur as the output of each of the processors will not match. For instance, if the processors each add the data stored to the first location of their respective cache with the data stored to the second location of their respective cache, the first processor (having the corrupt data) will output a result of "1" (0+1=1) while the second processor outputs a result of "2" (1+1=2), and thus their respective outputs will not match.

By employing such techniques as parity-based error detection mechanisms and output comparisons for lockstep paired processors, SDC detection can be enhanced such that practically no SDC occurring in a processor goes undetected (and thus such SDC does not remain "silent") but instead results in detection of LOL. However, the issue then becomes how best for the system to respond to detected LOL. The traditional response to detected LOL has been to crash the system to ensure that the detected error is not propagated through the system. That is, LOL in one pair of lockstep processors in a system halts processing of the system even if other processors that have not encountered an error are present in the system. However, with the increased desire for many systems to maintain high availability, crashing the system each time LOL is detected is not an attractive proposition. This is particularly unattractive for large systems having many processors because cosmic events typically occur more frequently as the processor count goes up, which would result in much more frequent system crashes in those large systems. High availability is a major desire for many customers having large, multi-processor systems, and thus having their system crash every few weeks is not an attractive option. Of course, permitting corrupt data to propagate through the system is also not a viable option.

Prior solutions attempting to resolve at least some detected SDCs without requiring the system to be crashed have been Operating System ("OS") centric. That is, in certain solutions the OS has been implemented in a manner to recover from a detected LOL without necessarily crashing the system. This OS-centric type of solution requires a lot of processor and platform specific knowledge to be embedded in the OS, and thus requires that the OS provider maintain the OS up-to-date as changes occur in later versions of the processors and platforms in which the OS is to be used. This is such a large burden that most commonly used OSs do not support lockstep recovery.

Certain solutions have attempted to recover from a LOL without involving the OS in such recovery procedure. For instance, in one technique upon LOL being detected, firmware is used to save the state of one of the processors in a lockstep pair (the processor that is considered "good") to memory, and then both processors of the pair are reset and reinitialized. Thereafter, the state is copied from the memory to each of the processors in the lockstep pair. This technique makes the processors unavailable for an amount of time without the OS having any knowledge regarding this unavailability, and if the amount of time required for recovery is too long, the system may crash. That is, typically, if a processor is unresponsive for X amount of time, the OS will assume that the processor is hung and will crashdump the system so that the problem can be diagnosed. Further, in the event that a processor in the pair cannot be reset and reinitialized (e.g., the processor has a physical problem and fails to pass its self-test), this technique results in crashing the system.

BRIEF SUMMARY OF THE INVENTION

According to one embodiment, a method comprises assigning a first processor of a multi-processor system a role of spare processor for at least a second processor, and responsive to detecting loss of lockstep (LOL) for any of the at least a second processor, the first processor replaces the processor for which the LOL is detected. The method further comprises reestablishing lockstep for the processor for which the LOL is detected, and assigning the processor having its lockstep reestablished the role of spare processor for at least the first processor.

According to one embodiment, a method comprises detecting loss of lockstep (LOL) for a processor in a multi-processor system, and determining that the processor for which the LOL is detected is assigned the role of boot processor. The method further comprises switching the role of boot processor to a spare processor without shutting down the system's operating system. The method further comprises reestablishing lockstep for the processor for which the LOL is detected without shutting down the system's operating system, and assigning the processor having its lockstep reestablished the role of spare processor for the processor assigned the role of boot processor.

According to one embodiment, a multi-processor system comprises an operating system, and non-volatile data storage having information stored thereto that assigns a first processor of the multi-processor system a role of spare processor for at least a second processor. The system further comprises logic operable, responsive to detecting loss of lockstep (LOL) for any of the at least a second processor, to cause the operating system to recognize the first processor as the processor for which the LOL is detected. The system further comprises logic operable to reestablish lockstep for the processor for which the LOL is detected without shutting down the operating system, and logic operable to assign the processor having its lockstep reestablished the role of spare processor for at least the first processor.

DETAILED DESCRIPTION OF THE INVENTION

Figure 1:
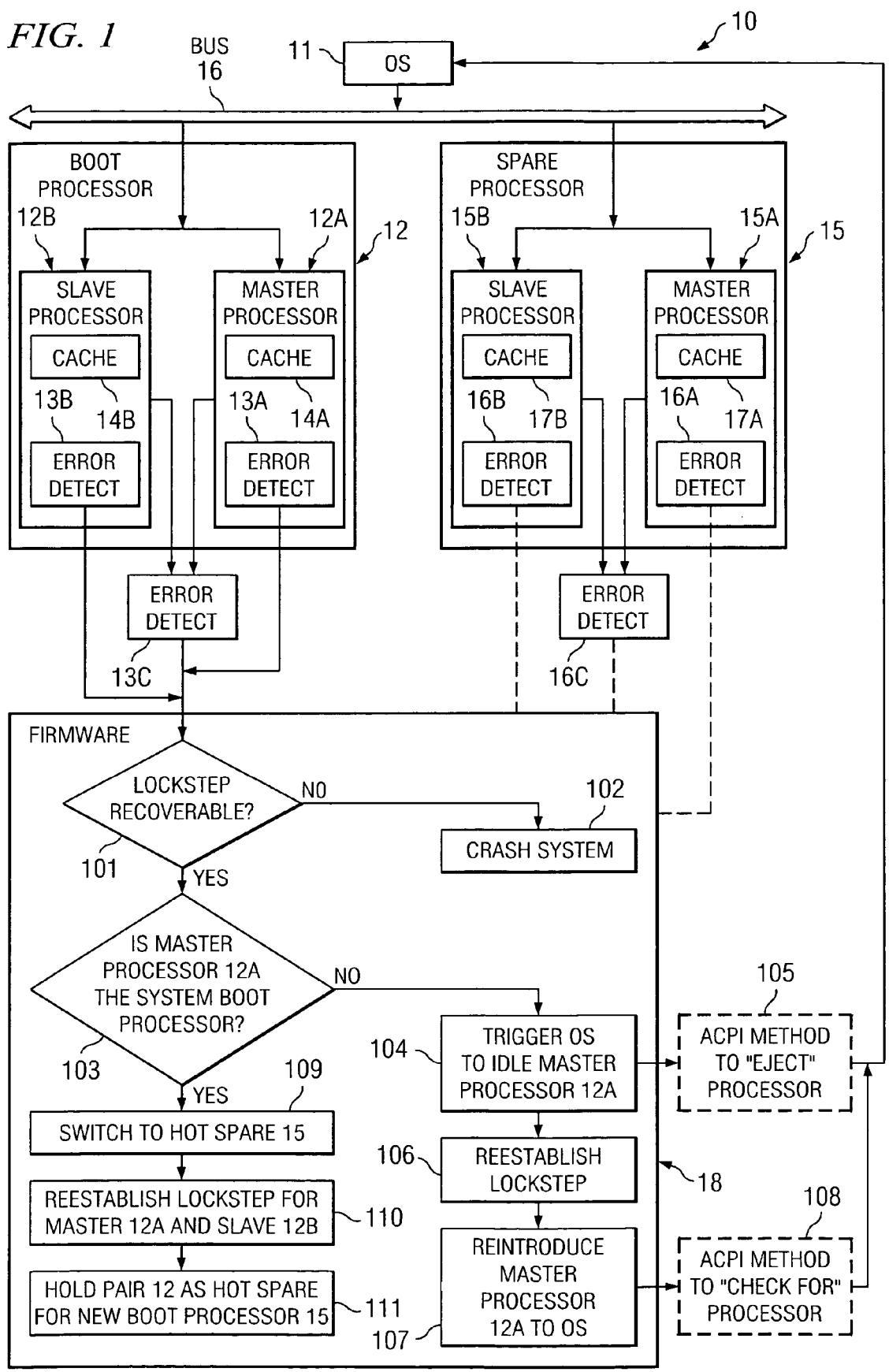
FIG. 1 shows an example multi-processor system in which firmware utilizes a spare processor for recovering from LOL for the system's boot processor.

As described further herein, in certain multi-processor systems, a first processor can be designated the role of "spare" processor and used in recovering from an LOL detected for another processor. For instance, a first processor module that includes a lockstep pair of processors may be designated the role of spare processor for a second processor module that also includes a lockstep pair of processors. Upon an LOL being detected for the second processor module, techniques are provided for the spare processor module to assume the role of such second processor module. Accordingly, the spare processor module takes over the responsibilities of the second processor module and the system can continue its normal operation. However, because the first processor module (that was designated the spare) has assumed the role of the second processor module, a spare is not available for taking over in the event that an LOL is detected for this first processor module. That is, because the designated spare processor module is utilized for taking over for the processor module for which LOL was detected, a spare processor module is no longer available in the system.

In accordance with various embodiments described herein, techniques are provided for maintaining a spare processor that has its lockstep established. For instance, continuing with the above example, in accordance with certain embodiments provided herein, the multi-processor system is capable of reestablishing lockstep for the second processor module, and then assigning this second processor module the role of spare processor for the first processor module. Thus, the first and second processor modules effectively switch roles, wherein the lockstep is reestablished for the processor module for which LOL was detected, and such processor module having its lockstep reestablished is designated as a spare for the processor module that assumed its role. Accordingly, continuing further with the above example, if an LOL is detected for the first processor module after it has taken over for the second processor module, the second processor module having its lockstep reestablished is now the designated spare and can assume the role of the first processor module. Accordingly, the spare processor module, which is the second processor module in this instance, takes over the responsibilities of the first processor module and the system can continue its normal operation. Lockstep is then reestablished for the first processor module and it again assumes the role of spare processor.

Thus, a spare processor having lockstep established is maintained on the multi-processor system, rather than such spare processor being lost upon the designated spare taking over for another processor responsive to a detected LOL in such other processor. In this manner, the multi-processor system is capable of dynamically recycling the processor module that is assigned the role of spare processor to ensure that a spare processor is maintained on the multi-processor system. Specifically, in certain embodiments, the processor module for which LOL is detected is effectively recycled into the role of spare processor by reestablishing the lockstep on such processor module and assigning the processor module the role of spare.

In certain embodiments, a spare processor module is designated for the system's boot processor, and is used to assume the role of boot processor if LOL is detected for the boot processor. Embodiments are provided herein in which once the spare processor assumes the role of boot processor, the former boot processor (for which LOL was detected) has its lockstep reestablished and is assigned the role of spare for the current boot processor. Thus, a spare processor is maintained for the boot processor without requiring that the system be shutdown.

As described further herein, in certain embodiments, a processor module can be designated as a spare for a plurality of other processors. For example, suppose a system includes Processors A, B, and C. Processor C can be designated as a spare for both Processors A and B. Thus, if an LOL is detected for either of Processors A or B, Processor C takes over for the processor for which LOL is detected, and the processor for which LOL is detected can then have its lockstep reestablished and assume the role of spare for the other two processors. For instance, suppose that Processor C is designated as a spare for both Processors A and B, and then LOL is detected for Processor B. Processor C takes the place of Processor B. The system then reestablishes lockstep for Processor B (e.g., by resetting Processor B), and assigns Processor B as the spare for Processors A and C. Thus, if an LOL is detected for either of Processors A or C, Processor B will take over for such processor, and so on.

As described further herein and in concurrently filed and commonly assigned U.S. patent application Ser. No. 10/973,076 titled "SYSTEM AND METHOD FOR PROVIDING FIRMWARE RECOVERABLE LOCKSTEP PROTECTION," the disclosure of which is incorporated herein by reference, certain techniques are provided for recovering from LOL detected for a boot processor in a multi-processor system, in which a spare processor is utilized for such recovery. For instance, upon LOL being detected for the system's boot processor, the spare processor assumes the role of boot processor, and then recovery of lockstep for the original boot processor is attempted. Accordingly, for such lockstep recovery technique, a spare processor is used for attempting to recover from LOL detected for the boot processor.

Exemplary techniques are described in concurrently filed and commonly assigned U.S. patent application Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR," the disclosure of which is incorporated herein by reference, for establishing a spare processor for the boot processor. Such exemplary techniques include techniques for establishing a hot spare processor that is held in reserve until such time as it is used to assume the role of boot processor responsive to a detected LOL in the boot processor. The exemplary techniques further include techniques for establishing an active spare processor that is not held in reserve, but is instead made available to the OS for executing instructions during normal system operation and is dynamically transformed into a hot spare (i.e., it is idled) such that it can assume the role of the boot processor responsive to detection of LOL in the boot processor.

Exemplary techniques are described in concurrently filed and commonly assigned U.S. patent application Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR," the disclosure of which is incorporated herein by reference, for switching the role of boot processor to an established spare processor responsive to detection of LOL in the boot processor. For instance, exemplary actions by system firmware for switching the role of boot processor to an established spare processor and thus causing the OS to recognize the established spare processor as the system's boot processor are provided therein.

Of course, the above-mentioned techniques for establishing a spare processor and using such spare processor for recovering from LOL detected for the system's boot processor may additionally or alternatively be applied for establishing and using such a spare for recovering from LOL detected for a non-boot processor. The techniques described further herein for maintaining a spare processor may be employed in the above-described systems for maintaining a spare processor for the system's boot processor, and the techniques described further herein may likewise be employed for maintaining a spare for one or more non-boot processors of a multi-processor system.

Turning to FIG. 1, an example embodiment of a system 10 in which a spare processor is used in recovering from detected loss of lockstep (LOL) for a system boot processor is shown. System 10 includes OS 11, as well as master processor 12A and slave processor 12B (collectively referred to as a lockstep processor pair 12). In certain implementations the lockstep processor pair 12 may be implemented on a single silicon chip, which is referred to as a "dual core processor" in which master processor 12A is a first core and slave processor 12B is a second core. Further, lockstep processor pair 12 may be referred to as a processor or CPU "module" because it includes a plurality of processors (12A and 12B) in such module. As described further herein, to certain portions of system 10, such as its OS 11, the processor module 12 may appear as a single processor because slave processor 12B is merely used for redundant processing for checking the output of master processor 12A. In this example, lockstep processor pair 12 is designated as the boot processor for system 10. As described further herein, in certain embodiments lockstep processor pair 12 is designated as the system boot processor by storing information to the system that specifies such designation.

Master processor 12A includes cache 14A, and slave processor 12B includes cache 14B. OS 11 and lockstep processor pair 12 are communicatively coupled to bus 16. Typically, master processor 12A and slave processor 12B are coupled to bus 16 via an interface that allows each of such processors to receive the same instructions to process, but such interface only communicates the output of master processor 12A back onto bus 16. The output of slave processor 12B is used solely for checking the output of mater processor 12A.

In this example, master processor 12A includes error detect logic 13A, and slave processor 12B includes error detect logic 13B. While shown as included in each of the processors 12A and 12B in this example, in certain embodiments the error detect logic 13A and 13B may be implemented external to processors 12A and 12B. Error detect logic 13A and 13B include logic for detecting errors, such as data cache errors, present in their respective processors 12A and 12B. Examples of error detect logic 13A and 13B include known parity-based mechanisms and ECC mechanisms. Error detect logic 13C is also included, which may include an XOR (exclusive OR) gate, for detecting a lockstep mismatch between master processor 12A and slave processor 12B. As mentioned above, a lockstep mismatch refers to the output of master processor 12A and slave processor 12B failing to match. While shown as external to the lockstep processor pair 12 in this example, in certain embodiments error detect logic 13C may be implemented on a common silicon chip with processors 12A and 12B.

Lockstep mismatch is one way of detecting a LOL between the master processor 12A and slave processor 12B. A detection of an error by either of error detect logic 13A and 13B also provides detection of LOL in the processors 12A and 12B. Because the detection of LOL by error detect logic 13A and 13B may occur before an actual lockstep mismatch occurs, the detection of LOL by error detect logic 13A and 13B may be referred to as a detection of a "precursor to lockstep mismatch". In other words, once an error (e.g., corrupt data) is detected by error detect logic 13A or 13B, such error may eventually propagate to a lockstep mismatch error that is detectable by error detect logic 13C.

System 10 further includes a second lockstep processor pair 15 that is communicatively coupled to bus 16. Lockstep processor pair 15 includes master processor 15A and slave processor 15B. Master processor 15A includes cache 17A, and slave processor 15B includes cache 17B. As with error detect logic 13A-13C implemented for lockstep processor pair 12, lockstep processor pair 15 has error detect logic 16A-16C. While only two lockstep processor pairs 12 and 15 are shown for simplicity in the example of FIG. 1, system 10 may include any number of such lockstep processor pairs. As one specific example, in one implementation system 10 includes 64 lockstep processor pairs, wherein the master processors of the pairs perform parallel processing for the system. In the specific example of FIG. 1, lockstep processor pair 15 is designated as a spare for boot processor 12, as described further herein.

In certain embodiments described herein, techniques are provided for switching the role of boot processor to the designated spare processor responsive to detection of LOL for the boot processor. Thus, the spare processor is used for recovery when LOL is detected for the system's boot processor. That is, the designated spare processor assumes the role of boot processor in the event that LOL is detected for the boot processor. In accordance with certain embodiments, upon LOL being detected for a boot processor, a hot spare processor (i.e., an idling processor that is available in the system) is transferred the role of boot processor, and then the former boot processor having LOL is reset to reestablish its lockstep. As described further herein, the former boot processor then assumes the role of spare processor for the current boot processor. In other embodiments, a processor is designated as a spare processor for the boot processor, but such designated spare processor is not held in reserve (idled) during normal system operation. Rather, the designated spare is utilized as an active processing resource made available to OS 11 for processing instructions that OS 11 schedules for such "active" spare processor. Upon LOL being detected for the boot processor, the designated spare processor is idled (thereby, transforming such active processor into a hot spare), and is transferred the role of boot processor. Thereafter, the former boot processor for which the LOL was detected may be reset to reestablish its lockstep, and such former boot processor may then be designated the role of spare for the current boot processor. Thus, in certain embodiments, a designated spare processor is not required to be held in reserve, but is instead an available resource for use within the system and is only transformed into an actual spare processor when needed for recovering from LOL for the boot processor.

Firmware 18 is also included in system 10, which in this embodiment is invoked upon an error being detected by any of the error detect logics 13A-13C and 16A-16C. In certain embodiments, processors 12A, 12B, 15A, and 15B are processors from the Itanium Processor Family (IPF). IPF is a 64-bit processor architecture co-developed by Hewlett-Packard Company and Intel Corporation, which is based on Explicitly Parallel Instruction Computing (EPIC). IPF is a well-known family of processors. IPF includes processors such as those having the code names of MERCED, MCKINLEY, and MADISON. In addition to supporting a 64-bit processor bus and a set of 128 registers, the 64-bit design of IPF allows access to a very large memory (VLM) and exploits features in EPIC. While a specific example implementation of one embodiment is described below for the IPF architecture, embodiments described herein for establishing a spare processor for recovering from LOL detected for a boot processor are not limited in application to an IPF architecture, but may be applied as well to other architectures (e.g., 32-bit processor architectures, etc.).

Processor architecture generally comprises corresponding supporting firmware, such as firmware 18 of system 10. For example, as described further below in conjunction with the specific example of FIG. 2, the IPF processor architecture comprises such supporting firmware as Processor Abstraction Layer (PAL), System Abstraction Layer (SAL), and Extended Firmware Interface (EFI). Such supporting firmware may enable, for example, the OS to access a particular function implemented for the processor. For instance, the OS may query the PAL as to the size of the cache implemented for the processor, etc. Other well-known functions provided by the supporting firmware (SAL, EFI) include, for example: (a) performing I/O configuration accesses to discover and program the I/O Hardware (SAL_PCI_CONFI- G_READ and SAL_PCI_CONFIG_WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s). Each of those interfaces provide standard, published procedure calls that are supported.

In the example system 10 of FIG. 1, firmware 18 utilizes the above-mentioned hot spare technique for recovering from LOL for a boot processor. That is, processor 15 is designated as a hot spare for boot processor 12, and such processor 15 is held as an idle, spare processor and assumes the role of boot processor in the event that an LOL is detected for boot processor 12. Of course, as described further herein, the above-mentioned technique in which a designated spare is not held in reserve but is instead dynamically transformed into a spare processor may be implemented by firmware 18 in alternative embodiments. As described further herein, in certain embodiments, a device tree is stored to a data storage device (e.g., SRAM) such that it is accessible to the firmware 18, wherein the device tree includes information identifying processor 12 as the system's boot processor and identifying processor 15 as the spare. The information specifying the boot processor and/or spare may be received as input from a user in certain embodiments. For instance, in certain embodiments a user interface is provided that enables a system administrator to designate the boot processor and/or spare processor in the multi-processor system. In other embodiments, the firmware 18 selects the boot processor and/or spare.

Suppose that during the system boot-up procedure, master processor 12A assumes the role of boot processor, as shown in the example of FIG. 1. In this example embodiment, lockstep processor pair 15 is held as a hot spare for recovering from a LOL that may be detected for the boot processor 12A. Of course, additional lockstep processor pairs may be included in system 10 (not specifically shown in the example of FIG. 1), and those additional lockstep processor pairs, which are not the system boot processor, may recover from LOL in a different manner that does not utilize a hot spare processor. Thus, in accordance with certain embodiments hereof, hot spare processor pair 15 is not needed for recovering from LOL detected for any non-boot processor, but may instead be used for recovery of LOL only if such LOL is detected for the boot processor (processor 12A in this example). Of course, in other embodiments, a designated spare may be used similarly for recovering from LOL for a non-boot processor.

Firmware 18 is included in this example, and upon detection of LOL by any of error detect logics 13A-13C, firmware 18 determines, in operational block 101, whether the detected LOL is a recoverable LOL. That is, firmware 18 determines in block 101 whether the detected LOL is of a type from which the firmware can recover lockstep for the lockstep processor pair 12 without crashing the system. As described further herein, lockstep is recoverable for certain detected LOLs (which may be referred to as "recoverable LOLs"), while lockstep is not recoverable for other detected LOLs (which may be referred to as "non-recoverable LOLs"). If the lockstep is not recoverable from the detected LOL, then in the example of FIG. 1 firmware 18 crashes the system in block 102.

If the lockstep is recoverable, then operation advances to block 103 whereat the firmware determines whether the processor for which the LOL was detected is the system's boot processor. Because the LOL is detected for the lockstep processor pair 12 in this example, firmware 18 determines whether master processor 12A is the system's boot processor. This can be determined, for example, by accessing the device tree 203 of FIG. 2 (described further below). The device tree may, in certain implementations, include a field for each processor indicating whether such processor is the system's boot processor. This field in the device tree may be set by the firmware during the boot-up process to identify the corresponding processor that is used as the system's boot processor or it may be pre-set by a system administrator (e.g., via a user interface), as examples. If determined in block 103 that the master processor 12A is not the system's boot processor, then operation advances in this example to block 104, and a lockstep recovery process is performed that does not utilize hot spare 15.

In the specific example shown in FIG. 1, if the lockstep is determined to be recoverable in block 101 and the processor for which the LOL is detected is determined in block 103 to not be the system boot processor, firmware 18 cooperates with OS 11 via standard OS methods to recover the lockstep. For instance, in the example embodiment of FIG. 1, Advanced Configuration and Power Interface (ACPI) methods are used by firmware 18 to cooperate with OS 11. Accordingly, no processor or platform specific knowledge is required to be embedded in OS 11, but instead any ACPI-compatible OS may be used, including without limitation HP-UX and Open VMS operating systems. Example techniques that may be used for recovering from LOL for non-boot processors of a system are described further in concurrently filed and commonly assigned U.S. patent application Ser. No. 10/973,076 titled "SYSTEM AND METHOD FOR PROVIDING FIRMWARE RECOVERABLE LOCKSTEP PROTECTION," the disclosure of which is incorporated herein by reference.

In the example embodiment of FIG. 1, if determined in block 103 that the processor for which the LOL is detected is not the system boot processor, firmware 18 triggers OS 11 to idle the master processor 12A in operational block 104. In this embodiment, firmware 18 utilizes an ACPI method 105 to "eject" master processor 12A, thereby triggering OS 11 to idle the master processor 12A (i.e., stop scheduling tasks for the processor). Of course, by idling master processor 12A, slave processor 12B will in turn be idled. Thus, idling master processor 12A results in idling the lockstep processor pair 12. In this example embodiment, OS 11 is not aware of the presence of slave processor 12B, but is instead aware of master processor 12A. The interface of lockstep processor pair 12 to bus 16 manages copying to slave processor 12B the instructions that are directed by OS 11 to master processor 12A. Thus, firmware 18 need not direct OS 11 to eject slave processor 12B, as OS 11 is not aware of such slave processor 12B in this example implementation. Again, by idling master processor 12A, slave processor 12B is also idled as it merely receives copies of the instructions directed to master processor 12A. Of course, if in a given implementation OS 11 is aware of slave 12B, firmware 18 may be implemented to also direct OS 11 to idle such slave processor 12B in a manner similar to that described for idling master processor 12A.

Firmware 18 then attempts to recover lockstep for the lockstep processor pair 12 in block 106. For instance, firmware 18 resets the processor pair 12. During such reset of processor pair 12, system 10 can continue to operate on its remaining available processors. Once the processor pair 12 is reset and lockstep is recovered, firmware 18 reintroduces master processor 12A to OS 11 in operational block 107. In this embodiment, firmware 18 updates the ACPI device table information for master processor 12A to indicate that such master processor 12A is "present, functioning and enabled." As discussed in the ACPI 2.0 specification for the _STA status method of a device, the _STA (status) object returns the status of a device, which can be one of the following: enabled, disabled, or removed. In this respect, in the result code (bitmap) bit 0 is set if the device is present; bit 1 is set if the device is enabled and decoding its resources; bit 2 is set if the device should be shown in the UI; bit 3 is set if the device is functioning properly (cleared if the device failed its diagnostics); bit 4 is set if the battery is present; and bits 5-31 are reserved. A device can only decode its hardware resources if both bits 0 and 1 are set. If the device is not present (bit 0 cleared) or not enabled (bit 1 cleared), then the device must not decode its resources. Bits 0, 1 and 3 are the "present, enabled and functioning" bits mentioned above. Firmware 18 utilizes an ACPI method 108 to trigger OS 11 to "check for" master processor 12A, thereby reintroducing the master processor 12A to OS 11. As a result of checking for master processor 12A, OS 11 will recognize that such master processor 12A is again available and will thus begin scheduling tasks for master processor 12A once again.

In view of the above, a recovery technique is provided that does not require utilizing a spare processor for recovering from LOL detected for non-boot processors. For various reasons, in certain system architectures problems arise in attempting to idle (or eject) the boot processor from the system. Thus, in certain embodiments, a hot spare processor is used for recovering from LOL for the system's boot processor. For instance, in the example of FIG. 1, if determined in block 103 that the master processor 12A is the system's boot processor, operation advances to block 109 whereat the state of the "good" processor in the lockstep processor pair 12 is copied over to each of processors 15A and 15B in the spare lockstep processor pair 15. Exemplary techniques that may be utilized by firmware 18 for switching the role of boot processor to the hot spare are described further in concurrently filed and commonly assigned U.S. patent application Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR," the disclosure of which is incorporated herein by reference.

Thus, operational block 109 essentially makes the spare processor pair 15 the system's boot processor, and then, as described further herein, firmware 18 resets the lockstep processor pair 12 and reestablishes its lockstep in block 110. Once lockstep is reestablished for lockstep processor pair 12, that pair is held in operational block 111 as a hot spare for the new boot processor pair 15. That is, firmware 18 updates the device tree 203 of FIG. 2 to reflect that lockstep processor pair 12 is a hot spare for the boot processor pair 15. Thus, should a recoverable LOL be detected for the new boot processor 15, the above process may be used by firmware 18 to make the spare lockstep processor pair 12 the boot processor and then recover lockstep for pair 15. Exemplary techniques for resetting the lockstep processor pair 12 and reestablishing its lockstep in which the lockstep processor pair 12 is then held as a hot spare are described further below.

Figure 2:
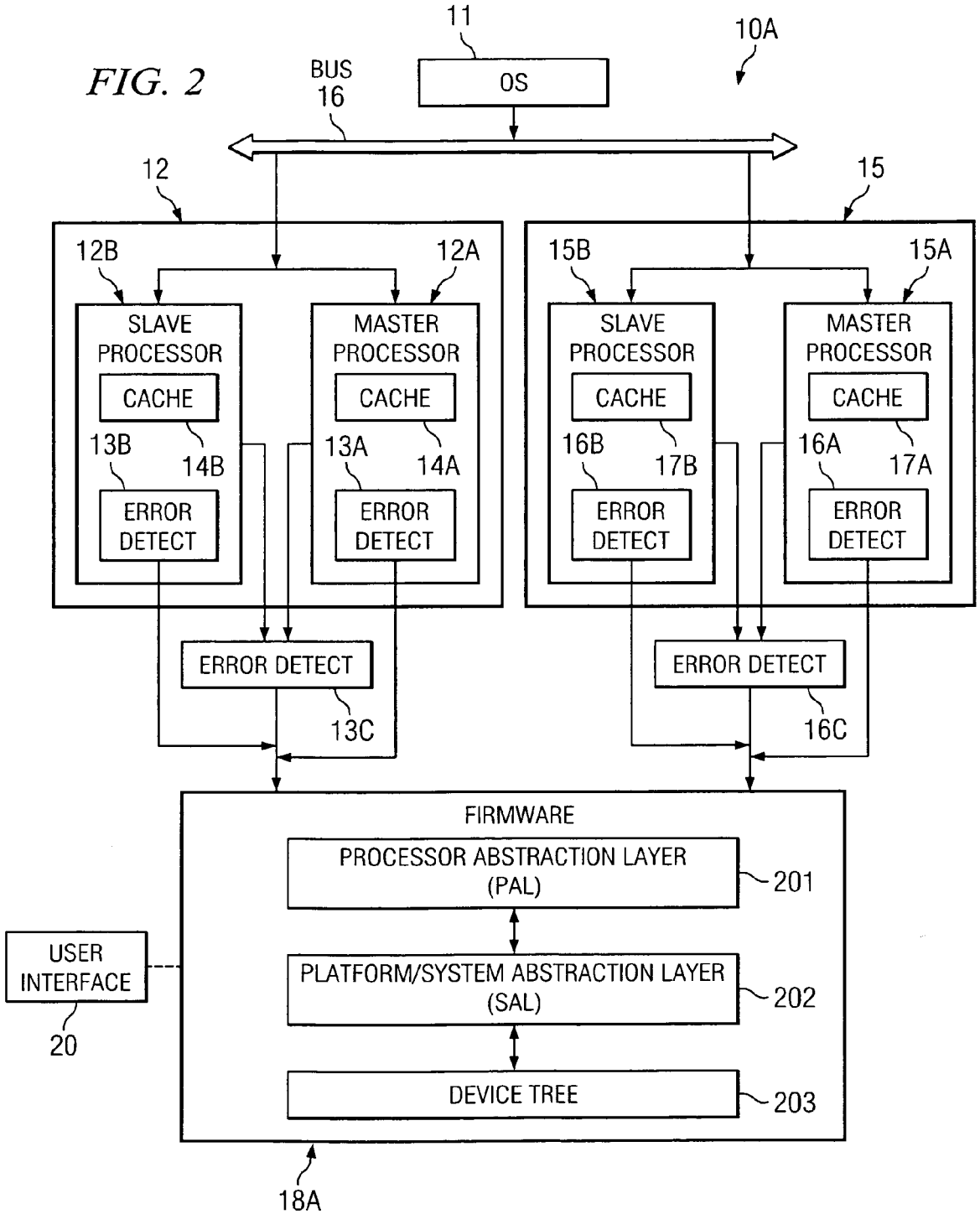
FIG. 2 shows a block diagram of one embodiment implemented for the IA-64 processor architecture.

FIG. 2 shows a block diagram of one embodiment of the above system 10, which is implemented for the IPF processor architecture and is labeled as system $10_A$. The quintessential model of the traditional IPF architecture is given in the *Intel IA-64 Architecture Software Developer's Manual, Volume* 2: *IA-64 System Architecture*, in section 11.1 Firmware Model, the disclosure of which is hereby incorporated herein by reference. Accordingly, in this example embodiment of system $10_A$, firmware 18, labeled as firmware $18_A$, includes processor abstraction layer (PAL) 201 and platform/system abstraction layer (SAL) 202. In general, PAL 201 is firmware provided by Intel for its processors, and SAL 202 is developed by an original equipment manufacturer (OEM) for the specific system/platform in which the processors are to be employed. PAL 201, SAL 202, as well as an extended firmware interface (EFI) layer (not shown), together provide, among other things, the processor and system initialization for an OS boot in an IPF system.

The boot-up process of a traditional IPF system, for example, proceeds as follows: When the system is first powered on, there are some sanity checks (e.g., power on self-test) that are performed by microprocessors included in the system platform, which are not the main system processors that run applications. After those checks have passed, power and clocks are given to a boot processor (which may, for example, be master processor 12A). The boot processor begins executing code out of the system's Read-Only Memory (ROM) (not specifically shown in FIG. 2). The code that executes is the PAL 201, which gets control of system 10. PAL 201 executes to acquire all of the processors in system $10_A$ (recall that there may be many lockstep processor pairs, such as pairs 12 and 15) such that the processors begin executing concurrently through the same firmware.

After it has performed its duty of initializing the processor(s), PAL 201 passes control of system $10_A$ to SAL 202. It is the responsibility of SAL 202 to discover what hardware is present on the system platform, and initialize it to make it available for the OS 11. When main memory is initialized and functional, the firmware $18_A$ is copied into the main memory. Then, control is passed to EFI (not shown), which is responsible for activating boot devices, which typically includes the disk. The EFI reads the disk to load a program into memory, typically referred to as an operating system loader. The EFI loads the OS loader into memory, and then passes it control of system $10_A$ by branching the boot processor into the entry point of such OS loader program.

The OS loader program then uses the standard firmware interfaces to discover and initialize system $10_A$ further for control. One of the things that the OS loader typically has to do in a multi-processor system is to retrieve control of the other processors (those processors other than the boot processor). For instance, at this point in a multi-processor system, the other processors may be executing in do-nothing loops. In an ACPI-compatible system, OS 11 makes ACPI calls to parse the ACPI tables to discover the other processors of a multi-processor system in a manner as is well-known in the art. Then OS 11 uses the firmware interfaces to cause those discovered processors to branch into the operating system code. At that point, OS 11 controls all of the processors and the firmware $18_A$ is no longer in control of system $10_A$.

As OS 11 is initializing, it has to discover from the firmware $18_A$ what hardware is present at boot time. And in the ACPI standards, it also discovers what hardware is present or added or removed at run-time. Further, the supporting firmware (PAL, SAL, and EFI) are also used during system runtime to support the processor. For example, OS 11 may access a particular function of master processor 12A via the supporting firmware $18_A$, such as querying PAL 201 for the number, size, etc., of the processor's cache 14A. Some other well-known firmware functions that OS 11 may employ during runtime include: (a) PAL 201 may be invoked to configure or change processor features such as disabling transaction queuing (PAL_BUS_SET_FEATURES); (b) PAL 201 may be invoked to flush processor caches (PAL_CACHE_FLUSH); (c) SAL 202 may be invoked to retrieve error logs following a system error (SAL_GET_STATE_INFO, SAL_CLEAR_STATE_INFO); (d) SAL 202 may be invoked as part of hot-plug sequences in which new I/O cards are installed into the hardware (SAL_PCI_CONFIG_READ, SAL_PCI_CONFIG_WRIT); (e) EFI may be invoked to change the boot device path for the next time the system reboots (SetVariable); (f) EFI may be invoked to change the clock/calendar hardware settings; and (g) EFI may be invoked to shutdown the system (ResetSystem).

A "device tree" is provided, which is shown as device tree 203 in this example. Device tree 203 is stored in SRAM (Scratch RAM) on the cell, which is RAM that is reinitialized. Firmware 18A builds the device tree 203 as it discovers what hardware is installed in the system. Firmware then converts this information to the ACPI tables format and presents it to OS 11 so that OS 11 can know what is installed in the system. The ACPI device tables (not shown) are only consumed by OS 11 at boot time, so they are never updated as things change. For OS 11 to find the current status, it calls an ACPI "method" to discover the "current status". The _STA method described above is an example of such an ACPI method. When _STA is called, the AML can look for properties on the device specified in the firmware device tree and convert that into the Result Code bitmap described above. So, if lockstep has been lost on a processor, firmware 15A will set the device tree property that indicates loss of lockstep, then when OS 11 calls _STA for that device, the "lockstep lost" property directs the AML code to return to "0" in the "functioning properly" bit so that OS 11 can know there is a problem with that processor.

If a lost lockstep is recovered in accordance with the recovery technique described herein, firmware 18A can indicate that lockstep has been recovered in the device tree 203. Then when _STA is called on that device responsive to the OS receiving the "check for device" ACPI method, the present, enabled and functioning bits will all be set and OS 11 will know the CPU is safe to use.

Further, device tree 203 includes information designating which processor is the boot processor, as well as a spare processor for the boot processor. A simple example of device tree 203 is shown below in Table 1:

TABLE 1

| Device | Status | Lockstep Enabled | Boot Processor? | Spare for Boot Processor? |
|---|---|---|---|---|
| Processor A | Present, Enabled, and Functioning | Yes | Yes | No |
| Processor B | N/A | Yes | No | Yes |
| Processor C | Present, Enabled, and Functioning | Yes | No | No |
| ... | ... | ... | ... | ... |

In the above example of Table 1, 3 processors "Processor A," "Processor B," and "Processor C" are identified in the device tree as being included in the multi-processor system. The status of each of processors Processor A and Processor B is identified as "Present, Enabled, and Functioning." In this example Processor B is a hot spare, so it is held in reserve and does not show up in the static ACPI tables that are built when the system boots. Accordingly the OS does not know about Processor B and does not have a device handle to call the _STA method on. As described above, the _STA method is a known ACPI method for checking the status of the corresponding device. Therefore, the status of Processor B is designated N/A (not applicable) in this example because the _STA method will not be called for this processor as long as it is the hot spare. Of course, upon such spare assuming the role of boot processor, its status is updated to "Present, Enabled, and Functioning." In other embodiments in which Processor B is an active spare, the OS will be aware of such processor and accordingly its status may be also indicated as "Present, Enabled, and Functioning."

Further, lockstep is identified in this example as enabled for these processors. In certain embodiments, the system administrator can designate, via user interface 20, whether lockstep mode is to be enabled for the system's processors. Further, Processor A is designated as the system's boot processor in the example device tree shown in Table 1, and Processor B is designated as the spare processor. Thus, upon detection of LOL for one of the processors in the system, the firmware can access this device tree to determine if the processor for which LOL is detected is the system's boot processor; and if determined that the processor for which LOL is detected is the system's boot processor, the firmware can further determine from this device tree the designated spare processor to use in the lockstep recovery process. As described further herein, once the designated spare processor is used for assuming the role of boot processor (responsive to detection of LOL on the boot processor), the system reestablishes lockstep for former boot processor (for which LOL was detected) and the device tree is updated to reflect the former spare processor as the boot processor and the former boot processor as the spare.

In the example of FIG. 2, a user interface 20 is included, which allows a user (e.g., system administrator) to designate the system's boot processor and spare processor. In certain embodiments, the user interface 20 further allows the user to designate other information, such as whether lockstep mode is enabled for the processors.

Figure 3:
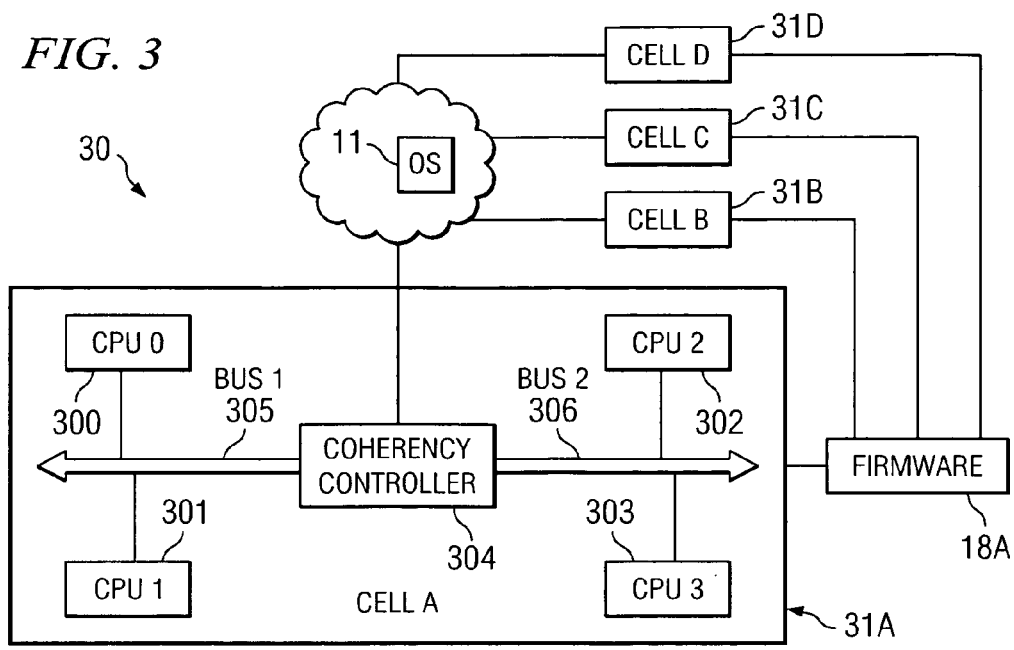
FIG. 3 shows an exemplary system having multi-processor cells in which an embodiment for switching the role of boot processor to a spare processor responsive to detected LOL in the boot processor may be employed.

One exemplary system in which firmware $18_A$ of FIG. 2 may be employed is shown in FIG. 3. FIG. 3 shows system 30 that includes multi-processor cells A-D, labeled $31_A$-$31_D$, respectively. Cell A $31_A$ is shown in more detail, and should be understood that cells B-D $31_B$-$31_D$ have substantially the same architecture as that of cell A $31_A$ in this example. The architecture of cell A $31_A$ described hereafter corresponds to that of Hewlett-Packard's Superdome™ systems. As shown, multi-processor cell A $31_A$ includes coherency controller 304 that is communicatively coupled to two buses, labeled 305 and 306, respectively. A plurality of processor modules are included within cell A $31_A$, shown as CPU 0, CPU 1, CPU 2 and CPU 3 (and labeled 300-303, respectively). More particularly, a plurality of processors modules are communicatively coupled to each of the buses 305 and 306. In this example, CPU 0 (300) and CPU 1 (301) are each communicatively coupled to the first bus 305, and CPU 2 (302) and CPU 3 (303) are each communicatively coupled to the second bus 306. It should be understood that each of CPU 0 (300), CPU 1 (301), CPU 2 (302), and CPU 3 (303) is in actuality a lockstep processor pair, such as the lockstep processor pair 12 of FIGS. 1-3. Thus, for instance, CPU 0 (300) includes both a master processor and a slave processor, as with processors 12A and 12B included in the lockstep processor pair 12 of FIGS. 1-2.

Coherency controller 304 decodes the address an interrupt is targeted towards and determines which bus (305 or 306) the interrupt packet should be delivered to. Each CPU on the destination bus sees the interrupt and compares the interrupt target address with its internal "LID" register to determine if it is the targeted CPU. If the match is correct, the CPU responds to the interrupt. If the match is not correct, the CPU ignores the interrupt packet.

As shown, the example firmware $18_A$ described above with FIGS. 1-2 may be employed to manage the recovery from detected LOLs for the processors of cells A-D ($31_A$-$31_D$). In this example architecture, when designating a spare for the boot processor, such spare is selected to be another processor communicatively coupled to the same bus as the boot processor. For instance, suppose that during the boot-up of system 30, CPU 2 (302) is designated as the boot processor. Accordingly, firmware $18_A$ will identify another processor that is communicatively coupled to bus 306 to designate as a spare for such boot processor, such as CPU 3 (303). During runtime if a LOL is detected for CPU 2 (302), then firmware $18_A$ may operate according to the process described above in FIG. 1 to switch the designation of boot processor to a designated spare, CPU 3 (303). In performing this switch the LID register of the CPU that lost lockstep is copied into the LID register of the spare CPU and the spare CPU pair will then assume the ID of the failed CPU and start responding to interrupts directed to that ID. The LID of the failed CPU is quickly re-written to a different value so that it will no longer respond to interrupts directed to that ID. CPU 2 (302) can then be reset to recover its lockstep, and such CPU 2 (302) is then designated as a spare for the new boot processor CPU 3 (303).

It should be recognized that in the example system of FIG. 3, if a hot spare were used for recovering from LOL for all processors, rather than just for the boot processor, much of the potential processing resources would be required to be held in reserve as spare resources. For instance, a hot spare would be required on each of the buses of each cell. Because there are two processors coupled to each bus in this example (i.e., CPU 0 and CPU 1 coupled to bus 305, and CPU 2 and CPU 3 coupled to bus 306), reserving a hot spare processor for each bus would result in holding half of the total processing resources in reserve. This is an undesirably expensive and wasteful solution. Thus, according to the illustrated embodiment, a hot spare processor is reserved only for the boot processor. Thus, continuing with the above example in which CPU 2 is the boot processor and CPU 3 is held as a "hot" spare, both of CPU 0 and CPU 1 are active (i.e., neither are held in spare). Further, none of the processors of cells B-D need to be held in reserve as hot spares. In the event of a recoverable LOL occurring for any of non-boot processors of the cells, the lockstep recovery process of FIG. 1 (i.e., operational blocks 104-108) can be utilized without requiring a spare for lockstep recovery for those non-boot processors.

While in the above example embodiment, a hot spare CPU is maintained for recovery from LOL for the system's boot processor, in an alternative embodiment a hot spare need not be held as such, but rather a processor can be dynamically made a "spare" when needed for recovery from LOL encountered for the system boot processor. That is, assuming as in the above example of FIG. 3 that CPU 2 is the system's boot processor, CPU 3 does not have to be held in reserve (idled) as a hot spare for CPU 2, but instead CPU 3 can be active and dynamically idled and made a "spare" upon detection of LOL in CPU 2. Accordingly, CPU 3 may be designated as a spare for the boot processor, but such CPU 3 need not be held in reserve during normal system operation. Instead, the CPU 3 may be dynamically (during system run-time) transformed into a spare processor (e.g., by causing the OS to idle such processor) in the event that a LOL is detected for the boot processor.

Thus, the resource of this spare CPU need not be wasted during normal runtime, but can be dynamically turned into a spare processor that is available for recovering from LOL encountered on CPU 2 in the manner described above. As an example of this embodiment, the firmware may send an "eject request" on a healthy processor pair (e.g., CPU 3), and lie to the OS by indicating (e.g., in response to an ACPI_STA method for the healthy processor pair) that such processor pair is not functioning. This would cause the OS to eject that processor pair as though it had encountered a LOL. This processor would become the "hot spare" and be used to replace the boot processor. The system boot processor role would be assumed by the idled healthy processor pair, just as described above in the example in which the healthy CPU 3 is held idle for the system boot processor, CPU 2. The only difference being that now the firmware had to take some initial action to turn the healthy processor pair into a "hot spare" by idling it and making it appear to the OS as though it was not functioning. Thus, the LIDs would be swapped. That is, the LID register of the boot processor that lost lockstep is copied into the LID register of the now spare processor pair (CPU 3 in this example), and the LID register of this spare processor pair would be copied into the LID register of the original boot processor. Lockstep is then reestablished on the original boot processor, and it can be reintroduced to the OS with the ID of the original non-boot processor that replaced it as the system boot processor. The processor that was formerly the boot processor is designated, in device tree 203, as the spare for the now boot processor.

Figure 4:
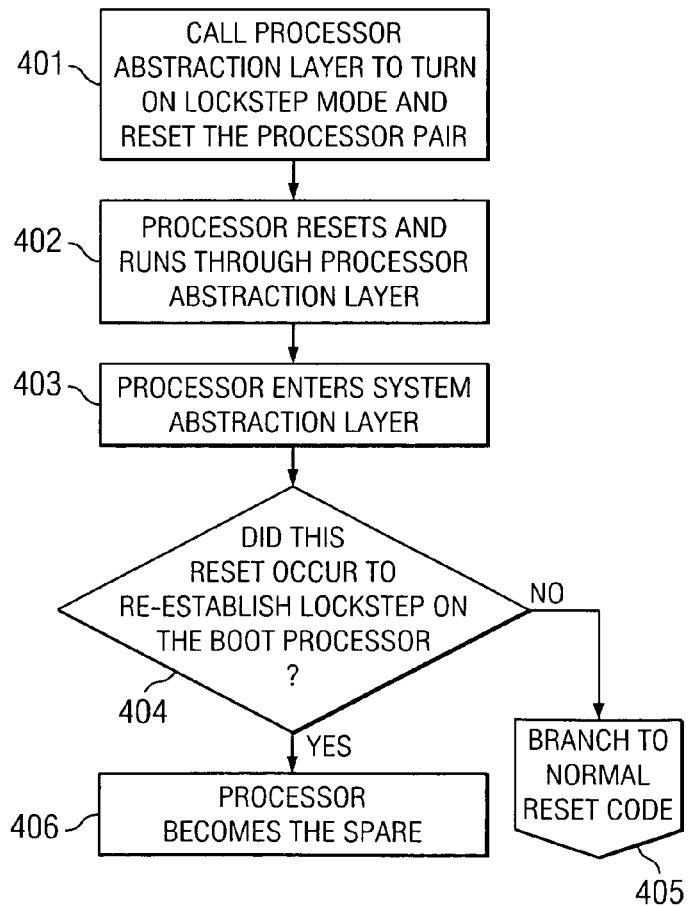
FIG. 4 shows an exemplary operational flow diagram for reestablishing lockstep on a boot processor, responsive to detecting LOL for such boot processor, and assigning the processor having its lockstep reestablished the role of spare processor according to one embodiment.

Turning to FIG. 4, an exemplary operational flow diagram for reestablishing lockstep on a boot processor, responsive to detecting LOL for such boot processor, and assigning the processor having its lockstep reestablished the role of spare processor according to one embodiment is shown. In this illustrative example, the operational flow of FIG. 4 is performed for a processor module once that processor module has encountered an LOL, and if a spare processor module is designated for the processor module for which LOL was detected, the spare processor module has assumed the role of the processor module for which LOL was detected. Exemplary techniques that may be employed for idling the processor module for which LOL is detected and passing control of such processor module to the system firmware are described in concurrently filed and commonly assigned U.S. patent application Ser. No. 10/972,888 titled "SYSTEM AND METHOD FOR SYSTEM FIRMWARE CAUSING AN OPERATING SYSTEM TO IDLE A PROCESSOR", the disclosure of which is hereby incorporated herein by reference. Exemplary techniques that may be employed for switching the role of a spare processor module to that of a processor module for which LOL has been detected are described in concurrently filed and commonly assigned U.S. patent application Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR," the disclosure of which is incorporated herein by reference.

In operational block 401, the system firmware calls PAL to turn on lockstep mode and reset the processor pair of the module for which LOL was detected. Thus, in this illustrative embodiment, the processor module for which LOL was detected is idled by the OS and control of such processor module is returned to the system firmware, whereupon the system firmware resets the processor module with its lockstep mode enabled. In operational block 402, the processor module resets and runs through PAL as it does in a normal reset. Further, as a result of such reset, the processor module enters SAL in block 403.

In block 404, SAL determines whether this reset occurred to re-establish lockstep on the boot processor. In accordance with one embodiment, upon LOL being detected for the processor module, a property is set for the node of the device tree corresponding with this processor module to indicate that an LOL has been detected for the processor module. For instance, the status field of this processor module may be set in the device tree to "Present, Enabled, and Non-Functioning" status. Thus, upon the processor module resetting, SAL may access its status field to see if its status was previously set to "Present, Enabled, and Non-Functioning" (indicating that the processor module was reset because of a detected LOL) or if processor's status is set to "Present, Enabled, and Functioning" (indicating that the processor module was not reset to reestablish its lockstep).

In this example, a spare is designated for use in recovering from LOL for the boot processor, wherein a technique that does not require use of a spare for recovery of lockstep may be employed for non-boot processors. Thus, if determined in block 404 that the processor module is the former boot processor and was reset to reestablish its lockstep, the SAL assigns this processor module the role of spare for the current boot processor in block 406. Accordingly, the processor module formerly designated as a spare for the boot processor has assumed the role of boot processor, and once the former boot processor (for which LOL was detected) resets and reestablishes its lockstep, the system firmware assigns such former boot processor the role of spare to the current boot processor. This former boot processor may be assigned the role of spare by designating it as such in the device tree, as described above. Additionally, the LID value for this processor module may be changed to a value reserved for a "spare" processor so that it does not respond to any interrupts targeted to the current boot processor. If determined in block 404 that the reset did not occur to reestablish lockstep on the former boot processor, operation advances to block 405 whereat the normal reset code is executed (i.e., the processor module is not assigned as the role of spare).

The exemplary procedure of FIG. 4 provides a technique for reestablishing lockstep on a boot processor and assigning this processor the role of spare processor in accordance with certain embodiments. While this exemplary operational flow is provided in FIG. 4, embodiments hereof are not limited to that illustrative example. For example, the techniques provided herein are not limited in application to designating a spare for use with a boot processor, but may additionally or alternatively be used for recovery from LOL detected for non-boot processors. Also, while the examples described herein provide a spare designated for one other processor (such as a boot processor), in other embodiments a spare may be designated for a plurality of other processors.

Figure 5:
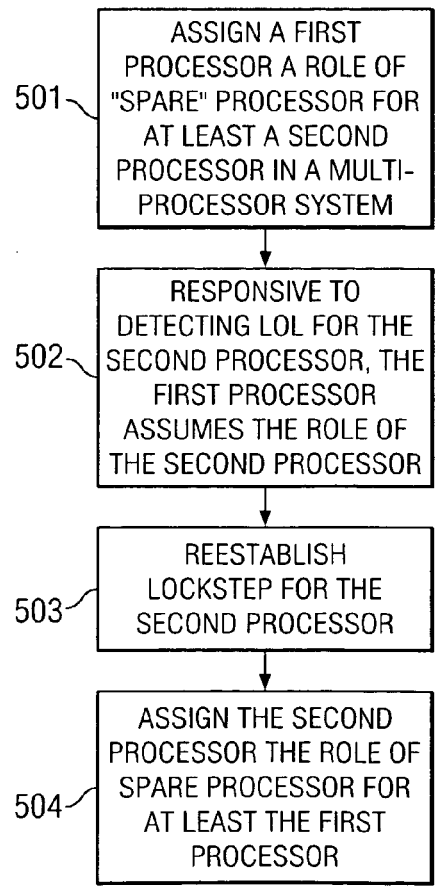
FIG. 5 shows a more general operational flow diagram for maintaining a spare processor that has lockstep for use in recovering from LOL for another processor according to certain embodiments.

FIG. 5 shows a more general operational flow diagram for maintaining a spare processor that has lockstep for use in recovering from LOL for another processor according to certain embodiments. In operational block 501, a first processor is assigned a role of spare processor for at least a second processor in a multi-processor system. In certain embodiments, the first processor may be designated as a spare in a device tree, as described above. Further, in certain embodiments, the first processor may be assigned as a spare to a plurality of processors. For instance, as described above, in a multi-processor system having Processor A, Processor B, and Processor C, Processor C may be assigned as a spare processor for both of Processors A and B.

In operational block 502, responsive to detecting LOL for the second processor, the first processor assumes the role of the second processor. That is, responsive to detecting LOL for any of the one or more processors for which the first processor is designated as a spare, the first processor assumes the role of such processor for which LOL is detected. In operational block 503, lockstep is reestablished for the processor for which LOL was detected. Thus, for instance, the processor may be reset to reestablish its lockstep without requiring that the OS be shutdown. In operational block 504, the processor module having its lockstep reestablished is assigned the role of spare processor for at least the first processor. That is, the processor module for which LOL was detected has its lockstep reestablished and it assumes the role of spare processor the first processor that replaced it as well as any other processors for which the first processor formerly served as spare.

What is claimed is:

1. A method comprising:
    assigning a first processor of a multi-processor system a role of spare processor for at least a second processor;
    responsive to detecting loss of lockstep (LOL) for any of the at least a second processor, said first processor replaces said processor for which said LOL is detected;
    triggering an operating system to idle the processor for which said LOL is detected when the processor for which said LOL is detected is not assigned a role of boot processor;
    reestablishing lockstep for the processor for which said LOL is detected; and
    assigning the processor having its lockstep reestablished the role of spare processor for at least the first processor when the processor for which said LOL is detected is assigned a role of boot processor.

2. The method of claim 1 wherein said at least a second processor comprises a boot processor.

3. The method of claim 1 wherein said reestablishing lockstep for the processor for which said LOL is detected comprises:
    reestablishing said lockstep for the processor for which said LOL is detected without shutting down the system's operating system.

4. The method of claim 1 wherein said reestablishing lockstep for the processor for which said LOL is detected comprises:
    resetting said processor for which said LOL is detected.

5. The method of claim 1 wherein said assigning said first processor of a multi-processor system a role of spare processor for at least a second processor further comprises:
    storing information to non-volatile data storage of said system that identifies said first processor as assigned the role of spare processor.

6. The method of claim 1 wherein said first processor replaces said processor for which said LOL is detected comprises:
    causing the system's operating system to recognize said first processor as the processor for which said LOL is detected.

7. The method of claim 1 wherein said first processor replaces said processor for which said LOL is detected without shutting down the system's operating system.

8. The method of claim 1 wherein said assigning said first processor of a multi-processor system a role of spare processor for at least a second processor comprises:
assigning said first processor a role of hot spare processor, wherein said first processor is held in reserve until said first processor replaces said processor for which said LOL is detected.

9. The method of claim 1 wherein said assigning said first processor of a multi-processor system a role of spare processor for at least a second processor comprises:
assigning said first processor a role of active spare processor.

10. The method of claim 1 further comprising:
responsive to detecting loss of lockstep (LOL) for said first processor after said first processor has replaced said processor for which said LOL is detected, said processor having its lockstep reestablished that is assigned the role of spare processor for at least the first processor replaces the first processor;
reestablishing lockstep for the first processor; and
assigning the first processor having its lockstep reestablished the role of spare processor for at least the second processor.

11. The method of claim 1 wherein system firmware obtains control over said processor for which said LOL is detected, and said system firmware performs said reestablishing lockstep for the processor for which said LOL is detected.

12. The method of claim 1 wherein system firmware performs said assigning the processor having its lockstep reestablished the role of spare processor for at least the first processor.

13. A method comprising:
detecting loss of lockstep (LOL) for a processor in a multi-processor system;
determining whether the processor for which said LOL is detected is assigned the role of boot processor;
switching the role of boot processor to a spare processor without shutting down the system's operating system when it is determined that the processor for which said LOL is detected is assigned the role of boot processor;
using firmware to trigger an operating system to idle the processor for which said LOL is detected when it is determined that the processor for which said LOL is detected is not assigned the role of boot processor;
reestablishing lockstep for the processor for which said LOL is detected without shutting down the system's operating system; and
assigning the processor having its lockstep reestablished the role of spare processor for the processor assigned the role of boot processor when it is determined that the processor for which said LOL is detected is assigned the role of boot processor.

14. The method of claim 13 wherein said reestablishing lockstep for the processor for which said LOL is detected comprises:
resetting said processor for which said LOL is detected.

15. The method of claim 13 wherein said switching the role of boot processor to said spare processor comprises:
causing the system's operating system to recognize said spare processor as the boot processor.

16. The method of claim 13 wherein said spare processor is held idle until said role of boot processor is switched to said spare processor.

17. The method of claim 13 wherein said spare processor is an active spare processor that is not held idle until said role of boot processor is switched to said spare processor.

18. A multi-processor system comprising:
an operating system;
non-volatile data storage having information stored thereto that assigns a first processor of said multi-processor system a role of spare processor for at least a second processor;
logic operable, responsive to detecting loss of lockstep (LOL) for any of the at least a second processor, to cause said operating system to recognize said first processor as said processor for which said LOL is detected;
logic operable to trigger an operating system to idle the processor for which said LOL is detected when the processor for which said LOL is detected is not assigned a role of boot processor;
logic operable to reestablish lockstep for the processor for which said LOL is detected without shutting down said operating system; and
logic operable to assign the processor having its lockstep reestablished the role of spare processor for at least the first processor when the processor for which said LOL is detected is assigned a role of boot processor.

19. The multi-processor system of claim 18 wherein said at least a second processor includes a boot processor.

20. The multi-processor system of claim 18 wherein said processor for which said LOL is detected is a boot processor.

21. The multi-processor system of claim 18 wherein each of said first and second processors is a processor module that includes a master processor and a slave processor.

22. The multi-processor system of claim 18 wherein said first processor comprises a master processor and a slave processor that operates in lockstep with said master processor.

23. A multi-processor system comprising:
an operating system;
means, responsive to detecting loss of lockstep (LOL) for a first processor that is designated as the system's boot processor, for causing said operating system to recognize as said boot processor a second processor that is designated a spare processor;
means, responsive to detecting LOL for said second processor that is not designated as the system's boot processor, for causing said operating system to idle said second processor for which said LOL is detected;
means for reestablishing lockstep for said processor for which said LOL is detected without shutting down said operating system; and
means for designating the first processor, having its lockstep reestablished, spare processor for said second processor when the processor for which said LOL is detected is assigned the role of boot processor.

24. The multi-processor system of claim 23 wherein said first and second processors are Itanium Processor Family (IPE) processors.

25. The multi-processor system of claim 23 further comprising:
non-volatile data storage having information stored thereto that assigns role of said boot processor and role of said spare processor to ones of the processors of said multi-processor system.

* * * * *

UNITED STATES PATENT AND TRADEMARK OFFICE
CERTIFICATE OF CORRECTION

| | | |
|---|---|---|
| PATENT NO. | : 7,366,948 B2 | Page 1 of 1 |
| APPLICATION NO. | : 10/972796 | |
| DATED | : April 29, 2008 | |
| INVENTOR(S) | : Scott L. Michaelis et al. | |

It is certified that error appears in the above-identified patent and that said Letters Patent is hereby corrected as shown below:

In column 20, line 59, in Claim 24, delete "(IPE)" and insert -- (IPF) --, therefor.

Signed and Sealed this

Nineteenth Day of August, 2008

JON W. DUDAS
*Director of the United States Patent and Trademark Office*